United States Patent
Brett et al.

(10) Patent No.: US 10,303,736 B2
(45) Date of Patent: May 28, 2019

(54) FFT DEVICE AND METHOD FOR PERFORMING A FAST FOURIER TRANSFORM

(71) Applicant: FREESCALE SEMICONDUCTOR, INC., Austin, TX (US)

(72) Inventors: Maik Brett, Taufkirchen (DE);
Navdeep Singh Gill, Mumbia (IN);
Rohit Tomar, Edinburgh (GB)

(73) Assignee: NXP USA, Inc., Austin, TX (US)

( * ) Notice: Subject to any disclaimer, the term of this patent is extended or adjusted under 35 U.S.C. 154(b) by 150 days.

(21) Appl. No.: 15/034,599

(22) PCT Filed: Dec. 16, 2013

(86) PCT No.: PCT/IB2013/060975
§ 371 (c)(1),
(2) Date: May 5, 2016

(87) PCT Pub. No.: WO2015/067997
PCT Pub. Date: May 14, 2015

(65) Prior Publication Data
US 2017/0132175 A1 May 11, 2017

(51) Int. Cl.
*G06F 17/14* (2006.01)
(52) U.S. Cl.
CPC .................. *G06F 17/142* (2013.01)
(58) Field of Classification Search
CPC .............. G06F 17/141; G06F 17/142
(Continued)

(56) References Cited

U.S. PATENT DOCUMENTS

| 4,970,674 A | 11/1990 | White |
| 6,073,154 A | 6/2000 | Dick |

(Continued)

FOREIGN PATENT DOCUMENTS

| WO | 2015067990 A1 | 5/2015 |
| WO | 20150067997 A1 | 5/2015 |

OTHER PUBLICATIONS

Zhang et al: "Fast and Accurate Direct MDCT to OFT Conversion With Arbitrary Window Functions", IEEE Transactions on Audio, Speech and Language Processing, IEEE, vol. 21, No. 3, Mar. 1, 2013 (Mar. 1, 2013), pp. 567-578.
Baireddy et al: "A 64/4096 point FFT/IFFT/Windowing Processor for Multi Standard ADSL/VDSL Applications", Signals, Systems and Electronics, 2007. ISSSE '07. International Symposium on, IEEE, PI, Jul. 1, 2007 (Jul. 1, 2007), pp. 403-405.
(Continued)

*Primary Examiner* — Andrew Caldwell
*Assistant Examiner* — Emily E Larocque

(57) ABSTRACT

An FFT device for performing a Fast Fourier Transform (FFT) is described. The FFT device comprises: a control unit arranged to control a sequence of transformation rounds; and a coefficient unit for providing transformation data; and a transformation unit arranged to receive the transformation data and to perform the respective linear transformation on the basis of the transformation data. The coefficient unit comprises or is integrated in a Random Access Memory (RAM) unit, the RAM unit comprising a set of memory blocks. The set of memory blocks comprises: a subset of window memory blocks or a subset of window-FFT memory blocks. The set of memory blocks further comprises a subset of FFT memory blocks providing a set of twiddle coefficients or a reduced set of twiddle coefficients.

11 Claims, 9 Drawing Sheets

(58) Field of Classification Search
USPC .......................................................... 708/404
See application file for complete search history.

(56) References Cited

U.S. PATENT DOCUMENTS

| | | | |
|---|---|---|---|
| 7,023,938 B1 | 4/2006 | Kapoor et al. | |
| 8,825,729 B1 | 9/2014 | Cope | |
| 2004/0162866 A1* | 8/2004 | Malvar | G06F 17/142 708/404 |
| 2005/0015420 A1 | 1/2005 | Gibb | |
| 2005/0160127 A1* | 7/2005 | Swartzlander, Jr. | G06F 17/142 708/404 |
| 2005/0251542 A1* | 11/2005 | Hennedy | G06F 17/142 708/300 |
| 2006/0235883 A1 | 10/2006 | Krebs | |
| 2007/0113048 A1 | 11/2007 | Royer et al. | |
| 2008/0071848 A1* | 3/2008 | Baireddy | G06F 17/142 708/404 |
| 2009/0135928 A1 | 5/2009 | Jang et al. | |

OTHER PUBLICATIONS

Takala et al., "Butterfly Unit Supporting RADIX-4 and RADIX-2 FFT", Journal of VLSI Signal Processing, vol. 43, p. 113-123, 2006.

Oppenheim et al., "Time-Discrete Signal Processing (Digital Signal Processing)", 2nd Edition, Oldenbourg Publishing Company, 1995, ISBN 3-486-22948-6, pp. 710-713.

International Search Report for application #PCT/IB2013/059928, dated Aug. 7, 2014, 13 pages.

Anup et al., "A New Efficient Implementation of TDAC Synthesis Filterbank Based on RADIX-2 FFT", 14th European Signal Processing Conference (EUSIPCO 2006), Florence, Italy, Sep. 4-8, 2006, copyright by EURASIP, 4 pages.

International Search Report for application #PCT/IB2013/060975, dated Aug. 7, 2014, 12 pages.

Non-final Office Action for U.S. Appl. No. 15/034,622 dated Dec. 14, 2017, 11 pages.

Final Office Action dated Sep. 27, 2018 for U.S. Appl. No. 15/034,622, 22 pages.

Notice of Allowance dated Mar. 21, 2019 for U.S. Appl. No. 15/034,622, 20 pages.

\* cited by examiner $$X(p, q) = \sum_{l=0}^{3} [W_N^{lq} F(l, q)] W_4^{lp}$$

$$F(l, q) = \sum_{m=0}^{(N/4)-1} x(l, m) W_{N/4}^{mq}$$

$$p = 0, 1, 2, 3; \quad l = 0, 1, 2, 3; \quad q = 0, 1, 2, ..., \frac{N}{4} - 1$$

AND $$x(l, m) = x(4m + l)$$

$$X(p, q) = X(\frac{N}{4} p + q)$$

$$\begin{bmatrix} X0 \\ X1 \\ X2 \\ X3 \end{bmatrix} = \begin{bmatrix} 1 & 1 & 1 & 1 \\ 1 & -j & -1 & j \\ 1 & -1 & 1 & -1 \\ 1 & j & -1 & -j \end{bmatrix} \begin{bmatrix} 1x0 \\ W_N^m x1 \\ W_N^{2m} x2 \\ W_N^{3m} x3 \end{bmatrix}$$

FIG. 10

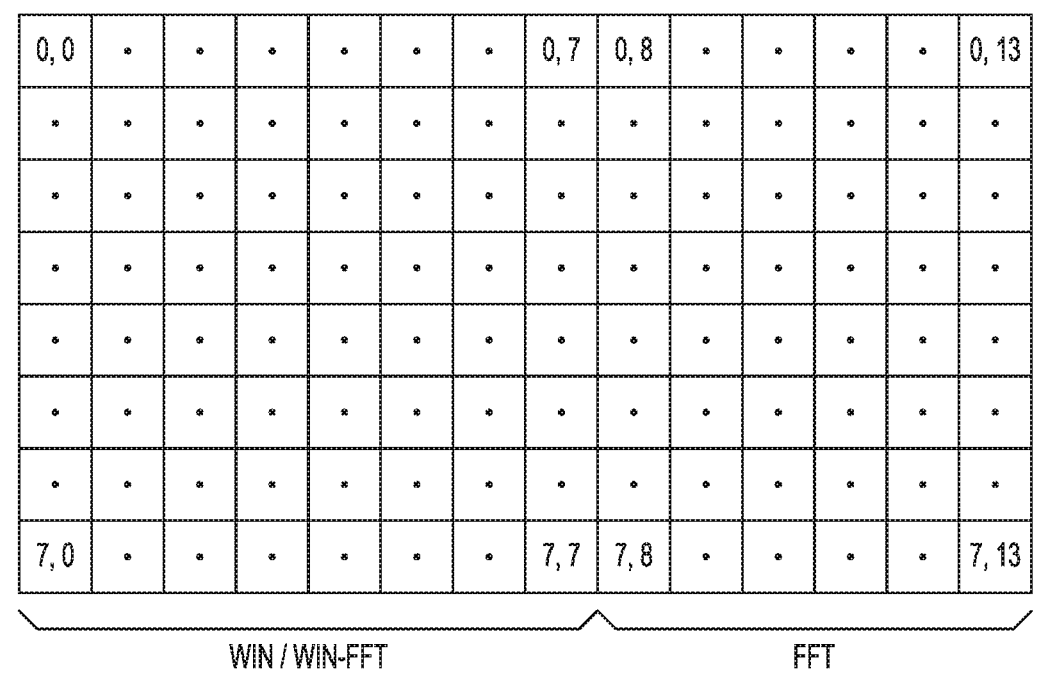

| 0,0 | • | • | • | • | • | • | 0,7 | 0,8 | • | • | • | • | 0,13 |
|---|---|---|---|---|---|---|---|---|---|---|---|---|---|
| • | • | • | • | • | • | • | • | • | • | • | • | • | • |
| • | • | • | • | • | • | • | • | • | • | • | • | • | • |
| • | • | • | • | • | • | • | • | • | • | • | • | • | • |
| • | • | • | • | • | • | • | • | • | • | • | • | • | • |
| • | • | • | • | • | • | • | • | • | • | • | • | • | • |
| • | • | • | • | • | • | • | • | • | • | • | • | • | • |
| 7,0 | • | • | • | • | • | • | 7,7 | 7,8 | • | • | • | • | 7,13 |

WIN / WIN-FFT      FFT

FFT DEVICE AND METHOD FOR PERFORMING A FAST FOURIER TRANSFORM

FIELD OF THE INVENTION

This invention relates to an FFT device and to a method for performing a Fast Fourier Transform.

BACKGROUND OF THE INVENTION

The Discrete Fourier Transform (DFT) is a linear transformation that maps a sequence of N input numbers x_0 to x_N−1 (input operands) into a corresponding set of N transformed numbers X_0 to X_N−1 (output operands). The output operands are also known as the spectrum of the input operands. A Fast Fourier Transform (FFT) is a processing scheme for carrying out a DFT numerically in an efficient manner. A DFT is representable as a non-sparse N-by-N matrix. The Cooley-Tukey algorithm is probably the most widely-used FFT algorithm. It exploits the fact that the DFT can be represented as a product of sparse N-by-N matrices. It transforms the input operands in a sequence of several rounds. Each round is a linear transformation between a set of input operands and a corresponding set of output operands. The output operands of a given round are used as the input operands of the next round until the final output operands, i.e., the DFT of the initial input operands, are obtained. Each of these linear transformations may be represented by a sparse matrix and therefore can be carried out rapidly.

Each round of the FFT may involve the evaluation of radices of order P, commonly referred to as radix-P butterflies or simply as butterflies. A radix P butterfly is a linear transformation between P input operands and P output operands. In many implementations, the radix order P is two, four, or eight. In each round, the N input operands may be partitioned into N/P sets of input operands. Each of these sets may be transformed individually, i.e., independently of the other sets of input operands, by means of the radix P butterfly.

The input operands x_1 to x_N may, for example, be the values of a continuous function x(t) defined on a certain finite interval [t_a, t_b]. In this case, the output operands of the FFT may be considered approximate values of the N leading Fourier coefficients of the function x(t), i.e., the leading N coefficients of an expansion of x(t) onto a discrete orthonormal basis set of complex plane waves. The basis functions, i.e., the complex plane waves, satisfy periodic boundary conditions. It can therefore be beneficial to apply a window function to the input operands prior to the first round of the FFT so as to reduce the amplitude of one or more successive input operands prior to performing the FFT. In this context, the input operand x_0 may be considered the successor to the input operand x_N−1, in accordance with the periodic boundary conditions. The modified input operands thus obtained may be referred to as the weighted or windowed input operands xw_0 to xw_N−1. In a simple example, xw_0=0, xw_I=x_I for I=1 to N−2, and x_N−1=0. Applying the FFT to the windowed input operands instead of the original input operands may reduce the effect known as leakage in FFT processing and produce a spectrum that can be more suitable for further analysis or processing.

In a decimation-in-time (DIT) FFT, the butterflies of a given round are pre-multiplied by a set of interstage twiddle coefficients. In a decimation-in-frequency (DIF) FFT, the butterflies of a given round are post-multiplied by a set of interstage twiddle coefficients.

SUMMARY OF THE INVENTION

The present invention provides an FFT device and a method for performing a Fast Fourier Transform as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
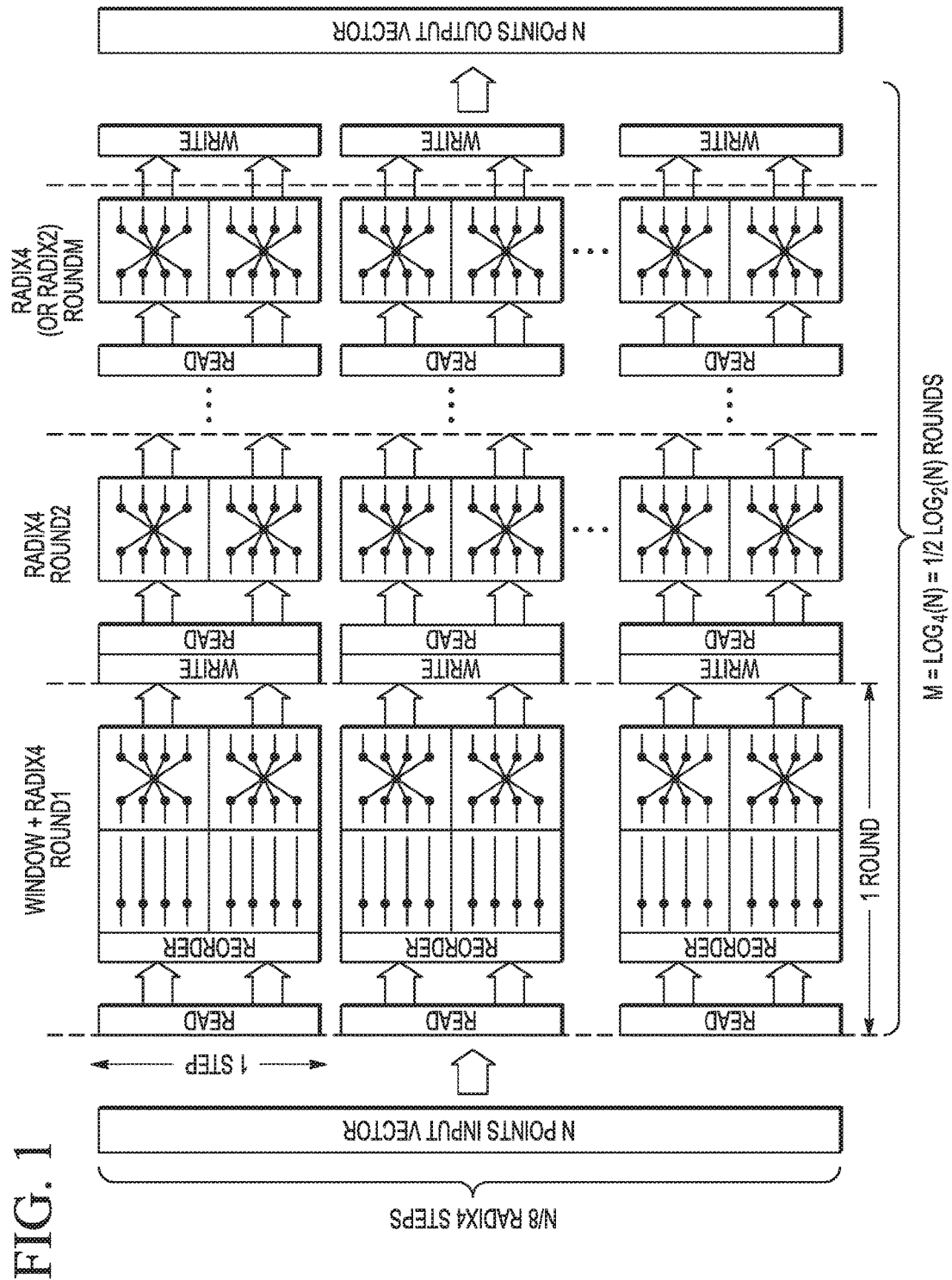
FIG. 1 schematically shows an example of an embodiment of an FFT.

FIG. 1 illustrates an example of a decimation-in-time (DIT) Fast Fourier Transform (FFT). In this example, the FFT comprises a total of log 4(N) FFT rounds. For instance, when N=4**5=1024, there are five FFT rounds. Each round involves a total of N/P radix-P butterflies. The butterflies of a given round may be evaluated independently from each other. Notably, they may be evaluated sequentially or in parallel. In the shown example, P=4 and each FFT round includes a total of N/P/2=N/8 steps, each step including evaluating two radix-4 butterflies in parallel, each step acting on a subset of eight input operands. In an example in which P=2, four radix-2 butterflies may be evaluated in parallel.

Figures 2, 3:
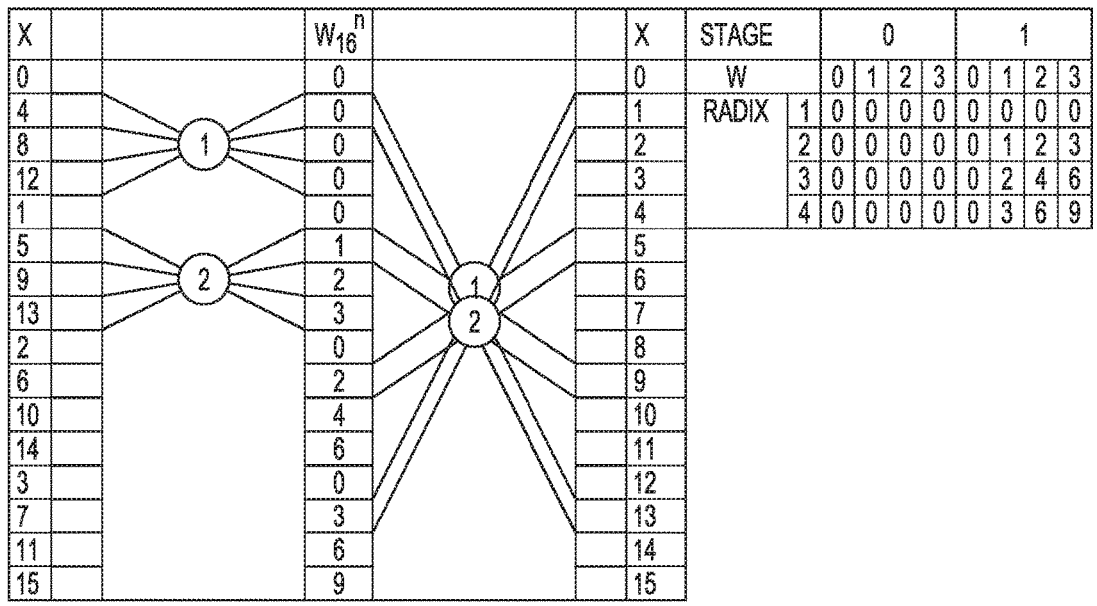
FIG. 2 schematically shows an example of an embodiment of an FFT, for N=16.
FIG. 3 shows an example of a radix-4 equation.

For example, when N=16, there are log 4(16)=2 FFT rounds, as illustrated by the example in FIG. 2. In this example, each round comprises four butterflies which may be numbered 1, 2, 3, and 4. Only butterflies 1 and 2 are shown in the Figure.

Figures 4, 5:
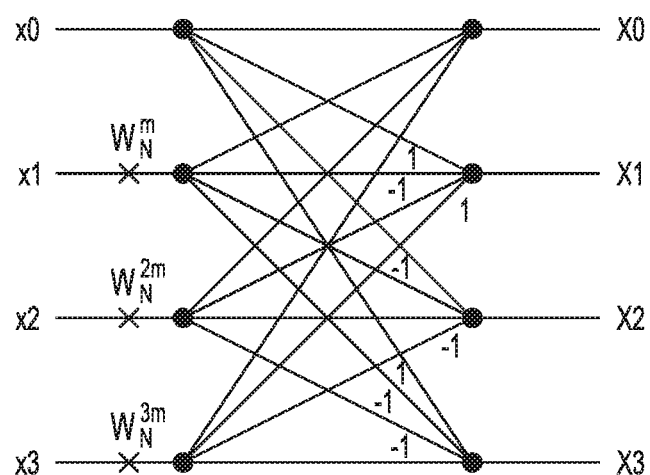
FIG. 4 shows an example of a radix-4 equation.
FIG. 5 schematically shows an example of a radix-4 butterfly.

A radix-4 butterfly may be defined, for example, as shown in FIGS. 3, 4, and 5. When the four input operands of a radix-4 butterfly are represented as a column vector x, the radix-4 butterfly may be expressed as a 4-by-4 matrix R for multiplying the column vector x from the left: X=R*x, x being the input vector, X being the output vector of the butterfly in question. The matrix R may in turn be expressed as a product U*W, wherein U is a 4-by-4 matrix which is the same for each radix-4 butterfly of each round, and W is a diagonal 4-by-4 matrix with diagonal elements that may be different for each butterfly. For example, in FIG. 4, the four lines of the matrix U are, in this order: (1 1 1 1), (1 −j −1 j), (1 −1 1 −1), and (1 j −1 −j), j being the imaginary unit.

The elements of the matrix R are known as twiddle coefficients, twiddle factors, or twiddles. The diagonal elements of the matrix W are known as inter-stage twiddles or inter-round twiddles, since they are used to multiply the output operands of a round, the multiplied output operands then being used as input of the next round. However, they may also be referred to as twiddle coefficients, twiddle factors, or twiddles, and a distinction between these and the elements of the matrix R is not necessarily made herein, considering that the former, i.e., the elements of the matrix R, are related to the latter, i.e., to the diagonal elements of the matrix W, in a trivial manner by the constant 4-by-4 matrix U. In other words, both W and R may be referred to as twiddles. In practice, a butterfly may be evaluated conveniently by first multiplying the respective input 4-vector x by W and then multiplying the 4-vector W*x by U, thus generating U*W*x.

Figure 6:
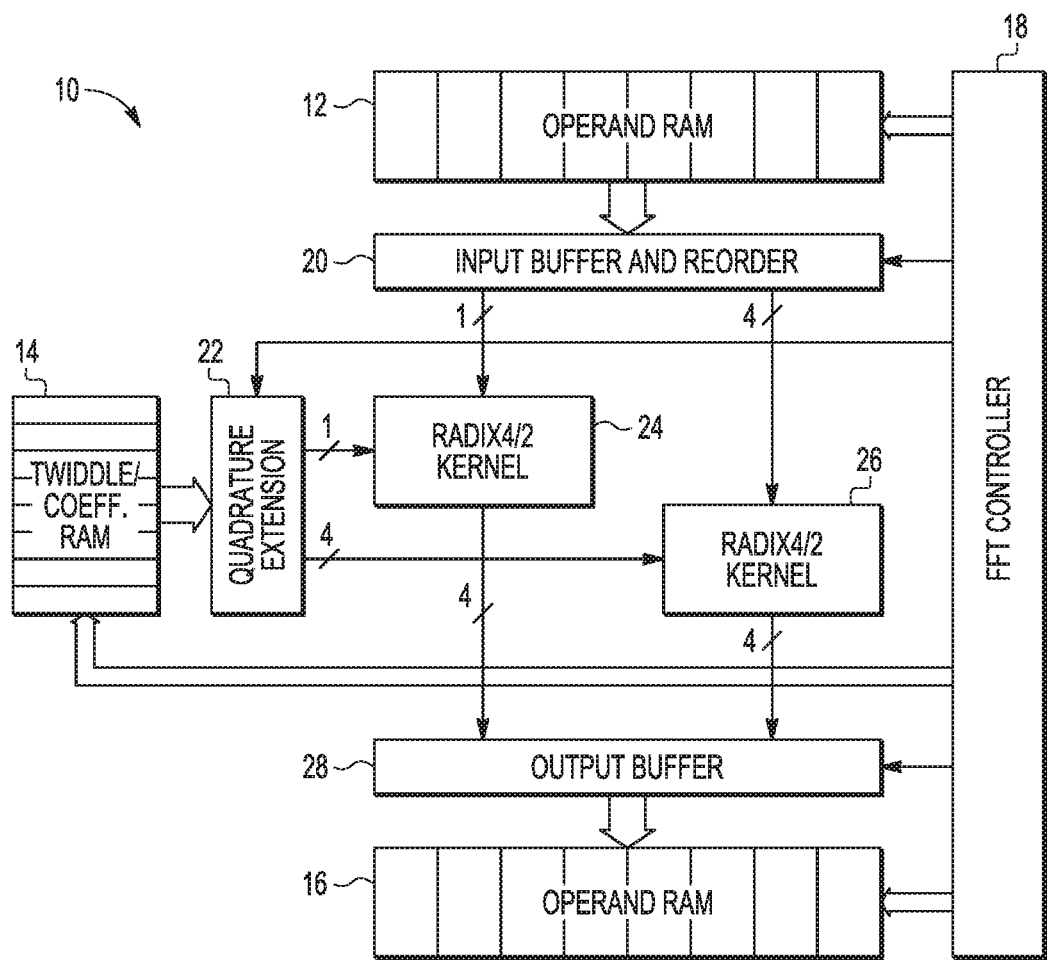
FIG. 6 schematically shows an example of an embodiment of an FFT device.

FIG. 6 schematically shows an example of an embodiment of an FFT device 10. The FFT device 10 notably comprises an input operand unit 12, a coefficient unit 14, 22, an output operand unit 16, and a control unit 18. In the shown example, the input and output operand units 12 and 16 may be implemented as separate units, e.g., as separate Random Access Memory (RAM) units. Alternatively, they may be implemented in a single unit, e.g., in a single RAM unit (not shown). The coefficient unit 14 may be implemented as, for example, a RAM. The FFT device 10 may further comprise, for example, an input buffer 20 and an output buffer 28.

Figure 9:
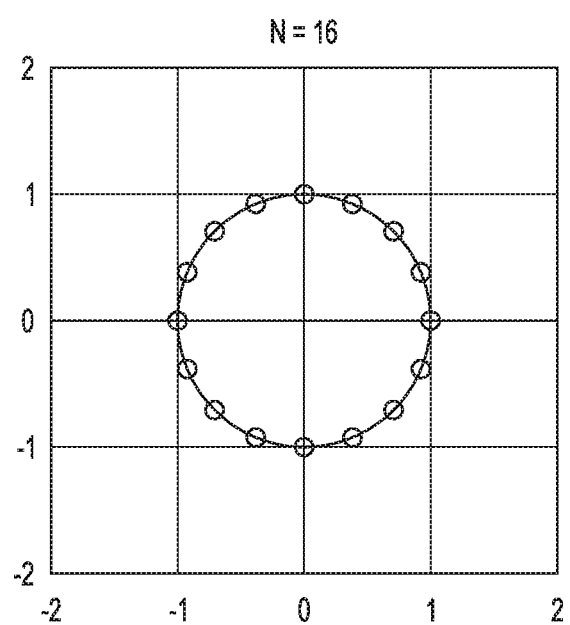
FIG. 9 schematically represents an example of a set of twiddle coefficients.
Figure 11:
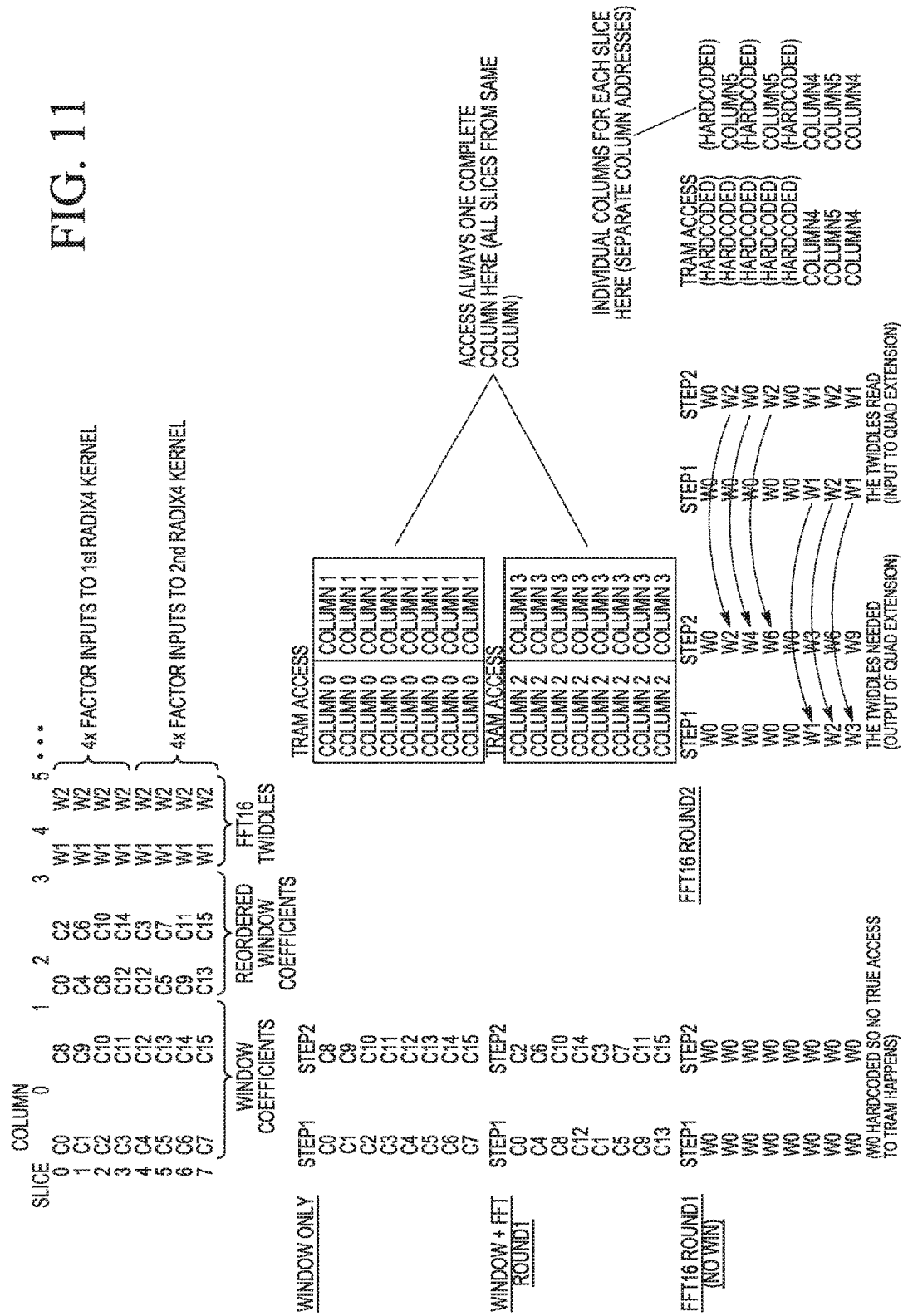

The coefficient unit 14, 22 may comprise, for example, a memory unit 14 and a quadrature extension unit 22. The memory unit 14 may be arranged to provide a set of window coefficients, a set of window-twiddle coefficients, and a set of twiddle coefficients. The set of twiddle coefficients may be a complete set or a reduced set of twiddle coefficients. The quadrature extension unit 22 may be arranged to compute a complete set of twiddle coefficients on the basis of the reduced set of twiddle coefficients by the use of symmetry properties of the twiddle coefficients. It is noted that the complete set of twiddle coefficients may be represented as a set of points on the unit circle in the plane of complex numbers, as schematically illustrated in FIG. 9 for the case of N=16. The unit circle is the set of complex numbers having an absolute value of one. The quadrature extension unit 22 may, for example, be arranged to compute the complete set of twiddle coefficients on the basis of the twiddle coefficients of a first octant of the unit circle. In this case, the twiddle coefficients of the other octants of the unit circle do not need to be stored in memory, allowing the coefficient unit 14 to have a smaller memory capacity than would be required for storing the complete set of twiddle coefficients. For example, in the case of N=16 (see FIG. 9), the complete set of sixteen twiddle coefficients may be computed, for example, from the two twiddle coefficients exp(0)=1 and exp(j*2*π/16). The twiddle coefficient 1 may conveniently be hardcoded, rather than provided in a RAM, considering that it is applicable for any value of N.

In a variant of the present example, the FFT device 10 does not include a quadrature extension unit and the complete set of twiddle coefficients is stored in the coefficient unit 14.

The FFT device 10 may further comprise a transformation unit 24, 26 arranged to transform an input vector x of any given round of the FFT into an output vector X of the round in question, as will be described in greater detail further below. The units shown in FIG. 6 may be suitably interconnected, e.g., as shown in the Figure, so as to enable copying data from one unit to another one in accordance with the examples of ways of operating the FFT device 10 described below.

The FFT 10 may operate, for example, as follows. An input vector x=(x_0, x_1, . . . , x_N−1) may be written to the input operand unit 12. The transformation unit 24, 26 may transform the input vector into an output vector X=(X_0, X_1, . . . , X_N−1) in a series of transformation rounds (also referred to herein as rounds).

Each round may include the following operations. The input vector of the round in question, i.e., the initial input vector x or the output vector X of the preceding round, may be copied to the transformation unit 24, 26. In the present example, the input vector x is copied to the transformation unit 24, 26 via the input buffer 20. If the round is a first FFT round, it may include reordering the elements of the input vector x in a suitable manner.

Furthermore, if the round is a first round of the series of transformation rounds, the round may be one of the following: an FFT round, a window-FFT round, or a window round. Any subsequent round, in contrast, is an FFT round. A window round is a round in which only a window transformation, and no radix transformation, is applied to the input vector of the round. An FFT round is a round in which only a set of radices is applied to the input vector of the round. A window-FFT round is a round in which a window transformation and a set of radix operations are performed together in single linear transformation.

If the round in question is a window round, the control unit 18 may control the coefficient unit 14, 22 to provide a set of window coefficients V_0 to V_N−1 to the transformation unit 24, 26. The window coefficients V_0 to V_N−1 may be provided in the same format as the twiddle coefficients, thus enabling the transformation unit 24, 26 to process them alike. Thus, the transformation unit 24, 26 does not require any significant additional circuitry for carrying out the window transformation. Instead, the transformation unit 24, 26 may use essentially the same circuitry for performing both the window round and the FFT rounds. A bypass circuit may be arranged to bypass the butterfly computation with the fixed twiddle matrix, or to tap the result after the complex multiplication.

If the round in question is a window-FFT round, the control unit 18 controls the coefficient unit 14 to provide a set of window-twiddle coefficients to the transformation unit 24, 26. The window-twiddle coefficients may combine a window operation and the radix operations of the first round of a normal FFT scheme in a single operation. This approach can be faster by one round compared to an approach in which a dedicated window round, as described above, is performed. The window-twiddle coefficients may notably include products of window coefficients and twiddle coefficients. The window-twiddle coefficients are then required in an order different from the order of the window coefficients V_0 to V_N−1 described above.

If the round in question is an FFT round, the control unit 18 controls the coefficient unit 14 to provide a set of twiddle coefficients to the transformation unit 24, 26.

In any of these three cases, the transformation unit 24, 26 then applies the respective linear transformation, i.e., the transformation defined in terms of window coefficients or window-twiddle coefficients or twiddle coefficients, to the input vector, thus generating a corresponding output vector in, e.g., the output buffer 28. The control unit 18 may control the output buffer 28 to pass on the output vector to the output operand unit 16. When the round is not the last round of the FFT, the control unit 18 may then feed the output vector back to the input operand unit 12, e.g., via an operand random access memory (OPRAM) unit, thus providing the input vector for the next round.

The coefficient unit 14 and the control unit 18 may be programmable, thus enabling a user to implement an FFT with or without a window transformation as desired. Furthermore, the user may thus be enabled to implement a window transformation as an extra round of the FFT or to integrate the window transformation into the first round of the FFT.

Figure 7:
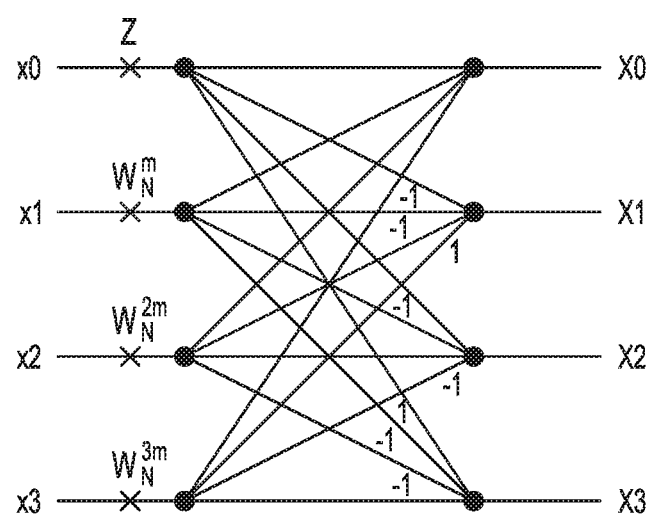
FIG. 7 schematically shows an example of a window radix-4 butterfly.

An example of a combined window and twiddle radix is schematically illustrated in FIG. 7. In this example, the factor one associated with x0 is replaced by a window factor Z whereas the twiddle coefficients $W\_N^m$, $W\_N^{2m}$, and $W\_N^{3m}$ associated with x1, x2, and x3, respectively, are unchanged.

Figure 8:
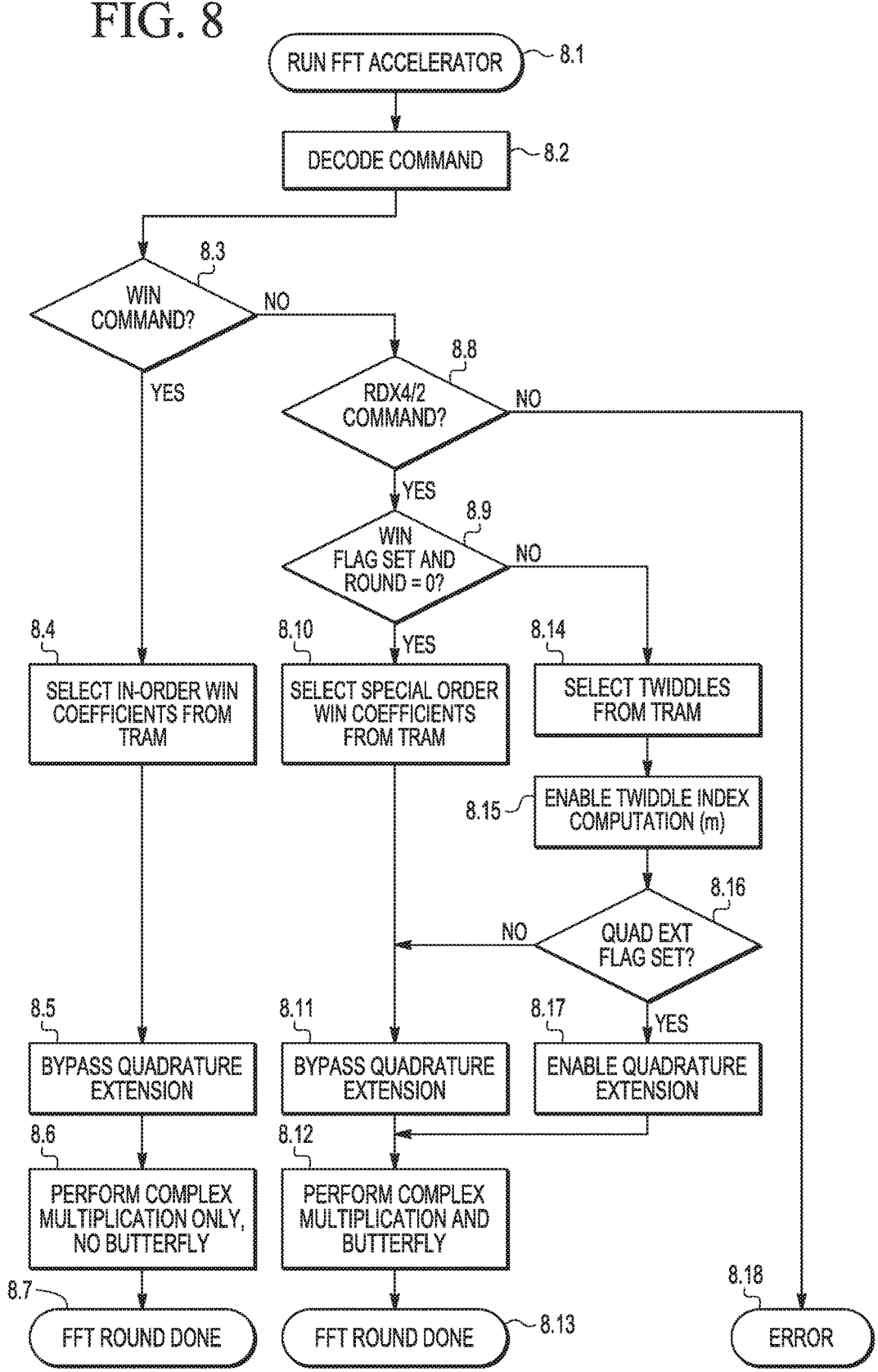
FIG. 8 shows a flow chart of an example of an embodiment of an FFT.

Referring now to FIG. 8, an example of a method method for performing a Fast Fourier Transform (FFT) of an operand vector of length N is described. The method comprises: carrying out a sequence of transformation rounds, including two or more FFT rounds and further including or not including a window round in addition to the FFT rounds; providing configuration data indicating for each of said transformation rounds whether the respective transformation round is a FFT round, a window-FFT round, or said window round. Each transformation round comprises: reading transformation data from a coefficient unit in dependence on whether the respective transformation round is a FFT round, a window-FFT round, or the window round as indicated by the configuration data; and carrying out the respective linear transformation on the basis of the transformation data.

Only a single round is represented in the figure for the sake of clarity. The round may start in box 8.1, with the control unit 18 reading a command from, e.g., a program memory unit (not shown). The command may be decoded (box 8.2). The control unit 18 may then determine whether the round is a window round, e.g., in dependence of a window flag (box 8.3).

If the round is a window round, the control unit 18 may select a set of window coefficients stored in e.g., the coefficient unit 14 (box 8.4). A quadrature extension unit is then bypassed (box 8.5). A window operation by may then applied to the input operand vector (box 8.6). For example, each component x_I of the input operand vector x may be multiplied by a corresponding window factor V_I (1=1 to N), resulting in a "windowed" vector (V_1*x_1, . . . , V_N*x_N). The window round may then be terminated (box 8.7).

If the round is not a window-FFT round, the control unit 18 may further determine (box 8.8) whether the command read in box 8.1 is a radix command. If it is not a radix command, an error signal may be generated (box 8.18) and the method may stop. If, however, the command is a radix command, it may be further determined (box 8.9) whether the round is a window-FFT round or an FFT round.

If the round is a window-FFT round, the control unit 18 may select a set of modified twiddle coefficients (box 8.10) stored in, e.g., the coefficient unit 14. The modified twiddle coefficients may be a complete set rather than a reduced set, considering that the modified twiddle coefficients do not necessarily have the symmetry of the twiddle coefficients. A quadrature extension may therefore be bypassed (box 8.11). The modified twiddle coefficients may be products of window coefficients and twiddle coefficients, corresponding to applying first a window operation and then a set of N/P radix-P operations on the input operand vector. It may be recalled that the window operation may be equivalent to a diagonal matrix and the set of N/P radix-P operations may be equivalent to a sparse non-diagonal matrix. The transformation unit 24, 26 may then apply the product of the window operation and the set of radix-P operations to the input operand vector, thus generating the output operand vector of the first round (box 8.12). The window-FFT round may then be terminated (box 8.13).

If, however, the round is an FFT round, the control unit 18 may select a set of twiddle coefficients (box 8.14) stored in, e.g., the coefficients unit 14. The set of twiddle coefficients may be a complete set or a reduced set. If it is a reduced set, a quadrature extension flag is set. Otherwise, the quadrature extension flag may be cleared. A twiddle index computation may be enabled in dependence of the round in question (box 8.15). If the quadrature extension flag is set (box 8.16), the process may move on to box 8.11 described above, bypassing a quadrature extension unit. Otherwise, a quadrature extension may be performed (box 8.17) to generate a complete set of twiddle coefficients on the basis of a reduced set of twiddle coefficients. From box 8.11 and from box 8.17, respectively, the process may move on to box 8.12 described above, now, however, involving the normal ("pure") twiddle coefficients and not any modified twiddle coefficients.

The transformation in box 8.8 may, for instance, be performed in a sequence of steps, each step including the evaluation of one or more radix-P butterflies. For example, a good compromise between cost and performance may be to perform each round by evaluating the butterflies in groups of two, i.e., evaluating two butterflies in parallel in each step. E.g., referring back to FIG. 6, the transformation unit 24, 25 may comprise a first radix-P unit 24 and a second radix-P unit 26 operable in parallel, each of the first and second radix-P units 24 and 26 being arranged to evaluate one radix-P in each step. In the example, P=4. Furthermore, each of the radix-P units 24 and 26 may additionally be arranged to evaluate a radix-2, that is, a radix of order P=2; e.g., for an application in which N is an odd power of two.

The example of an FFT scheme described above is of the decimation-in-time (DIT) type. In the case of a decimation-in-frequency (DIF) FFT, the butterfly twiddles and inter-stage twiddles have their positions changed. Furthermore, a time-domain window function can be integrated in the first round of a DIT FFT, as described above, but cannot be integrated in a single round of a DIF FFT. Furthermore, it is the input-reordered DIT, which requires input operands and coefficients in a special order, where the present invention makes it possible to execute pure window rounds, windowed FFT rounds and pure FFT rounds without the need for a window coefficient reordering module and with a reduced twiddle set.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the coefficient unit 14, the first input operand unit 12, and the second input operand unit 16 may be merged in a single unit. The first radix-P unit 24 and the second radix-P unit 26 may be replaced by a radix-2P unit, i.e., by a unit for evaluating a radix-2P butterfly. The integer P may, for example, be 2, 4, or 8.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the units 12 to 28 may be located on a single integrated circuit. Alternatively, the examples may be implemented as any number of separate integrated circuits or separate devices interconnected with each other in a suitable manner. For example, one or more of the units 12 to 26, e.g., the control unit 18, may be located on a separate device.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An FFT device for performing a Fast Fourier Transform (FFT) of an operand vector of length N, comprising:
   control circuitry arranged to control a sequence of transformation rounds, a first portion of the transformation rounds including two or more FFT rounds, wherein the FFT rounds include a window-FFT round, and second portion of the transformation rounds including a window round, wherein each transformation round of the transformation rounds comprises a sequence of N/M successive operations, each operation transforming a subvector of length M of said operand vector into a corresponding transformed subvector of length M; and coefficient circuitry connected to the control circuitry, the coefficient circuitry for providing transformation data;

transformation circuitry connected to the coefficient circuitry, the transformation circuitry arranged to receive, for each of said transformation rounds, transformation data from the coefficient circuitry, the transformation data depending on whether the respective transformation round is an FFT round, a window-FFT round, or said window round, and to perform the respective linear transformation on the basis of the transformation data;

an input operand Random Access Memory (RAM) connected to the control circuitry;

input buffer and reorder circuitry connected to the input operand RAM, to the control circuitry, and to the transformation circuitry;

an output buffer connected to the transformation circuitry and to the control circuitry; and an output operand RAM connected to the output buffer and to the control circuitry, wherein the transformation data for an FFT round comprises a set of twiddle coefficients, the transformation data for a window-FFT round comprises a set of modified twiddle coefficients, and the transformation data for a window round comprises a set of window coefficients;

and wherein the coefficient circuitry comprises or is integrated in Random Access Memory (RAM) circuitry, the RAM circuitry comprising a set of memory blocks, each memory block being readable as a whole within a single clock-cycle, wherein the set of memory blocks comprises:
 a subset of window memory blocks, each of said window memory blocks providing the window coefficients for a respective operation of the window round, or
 a subset of window-FFT memory blocks, each of said window-FFT memory blocks providing the modified twiddle coefficients for a respective operation of the window-FFT round,
and wherein the set of memory blocks further comprises:
 a subset of FFT memory blocks providing the set of twiddle coefficients or a reduced set of twiddle coefficients.

2. The FFT device of claim 1, wherein any twiddle coefficients having the value one are hardcoded and not provided by the RAM circuitry.

3. The FFT device of claim 1, wherein the coefficient circuitry comprises quadrature extension circuitry for providing a complete set of twiddle coefficients on the basis of said reduced set of twiddle coefficients of a first octant of a unit circle by exploiting symmetry properties of the twiddle coefficients.

4. The FFT device of claim 3, wherein the quadrature extension circuitry is arranged to be bypassed in any round that is a window round or a window-FFT round.

5. The FFT device of claim 1, wherein the transformation circuitry comprises first radix circuitry for performing a radix-P operation and second radix circuitry for performing a radix-P operation, wherein the first and second radix circuitries are arranged to operate in parallel.

6. A method for performing a Fast Fourier Transform (FFT) of an operand vector of length N, comprising:
 controlling, at control circuitry, a sequence of transformation rounds, the transformation rounds including two or more FFT rounds, wherein the FFT rounds include a window-FFT round or the transformation rounds further include a window round, wherein each transformation round comprises a sequence of N/M successive operations, each operation transforming a subvector of length M of said operand vector into a corresponding transformed subvector of length M;
 providing an input operand from an input operand Random Access Memory (RAM) via input buffer and reorder circuitry to transformation circuitry, the input operand RAM and the input buffer connected to the control circuitry;
 providing transformation data from Random Access Memory (RAM) circuitry, the transformation data for an FFT round comprising a set of twiddle coefficients, the transformation data for a window-FFT round comprises a set of modified twiddle coefficients, and the transformation data for a window round comprises a set of window coefficients; the RAM circuitry comprising a set of memory blocks, each memory block being readable as a whole within a single clock-cycle, wherein the set of memory blocks comprises a subset of FFT memory blocks providing the set of twiddle coefficients or a reduced set of twiddle coefficients and either: a subset of window memory blocks, each of said window memory blocks providing the window coefficients for a respective operation of the window round; or a subset of window-FFT memory blocks, each of said window-FFT memory blocks providing the modified twiddle coefficients for a respective operation of the window-FFT round,
 receiving, for each of said transformation rounds, said transformation data depending on whether the respective transformation round is an FFT round, a window-FFT round, or said window round, and performing a respective linear transformation on the basis of the transformation data; and
 providing an output of the respective linear transformation from the transformation circuitry via an output buffer to an output operand RAM, the output buffer and the output operand RAM connected to the control circuitry.

7. A nontransitory computer-readable medium storing computer program instructions for running on a programmable apparatus, at least including code portions for causing the programmable apparatus to perform a Fast Fourier Transform (FFT) of an operand vector of length N by controlling, in control circuitry, a sequence of transformation rounds, the transformation rounds including two or more FFT rounds, wherein the FFT rounds include a window-FFT round or the transformation rounds further include a window round, wherein each transformation round comprises a sequence of N/M successive operations, each operation transforming a subvector of length M of said operand vector into a corresponding transformed subvector of length M; providing an input operand from an input operand Random Access Memory (RAM) via input buffer and reorder circuitry to transformation circuitry the input operand RAM and the input buffer connected to the control circuitry; providing transformation data from Random Access Memory (RAM) circuitry, the transformation data for an FFT round comprising a set of twiddle coefficients, the transformation data for a window-FFT round comprises a set of modified twiddle coefficients, and the transformation data for a window round comprises a set of window coefficients; the RAM circuitry comprising a set of memory blocks, each memory block being readable as a whole within a single clock-cycle, wherein the set of memory blocks comprises a subset of FFT memory blocks providing the set of twiddle coefficients or a reduced set of twiddle coefficients and either: a subset of window memory blocks, each of said window memory blocks providing the window coefficients for a respective operation of the window round; or a subset of window-FFT memory blocks, each of said window-FFT memory blocks providing the modified twiddle coefficients for a respective operation of the window-FFT round, and receiving, for each of said transformation rounds, said transformation data depending on whether the respective transformation round is an FFT round, a window-FFT round, or said window round, and performing a respective linear transformation on the basis of the transformation data; and providing an output of the respective linear transformation from the transformation circuitry via an output buffer to an output operand RAM, the output buffer and the output operand RAM connected to the control circuitry.

8. The method of claim 6, wherein any twiddle coefficients having the value one are hardcoded and not provided by the RAM circuitry.

9. The method of claim 6, wherein the coefficient circuitry comprises quadrature extension circuitry for providing a complete set of twiddle coefficients on the basis of said reduced set of twiddle coefficients by exploiting symmetry properties of the twiddle coefficients.

10. The method of claim 9, wherein the quadrature extension circuitry is arranged to be bypassed in any round that is a window round or a window-FFT round.

11. The method of claim 6, wherein the transformation circuitry comprises first radix circuitry for performing a radix-P operation and second radix circuitry for performing a radix-P operation, wherein the first and second radix circuitries are arranged to operate in parallel.

* * * * *